Patented June 9, 1931

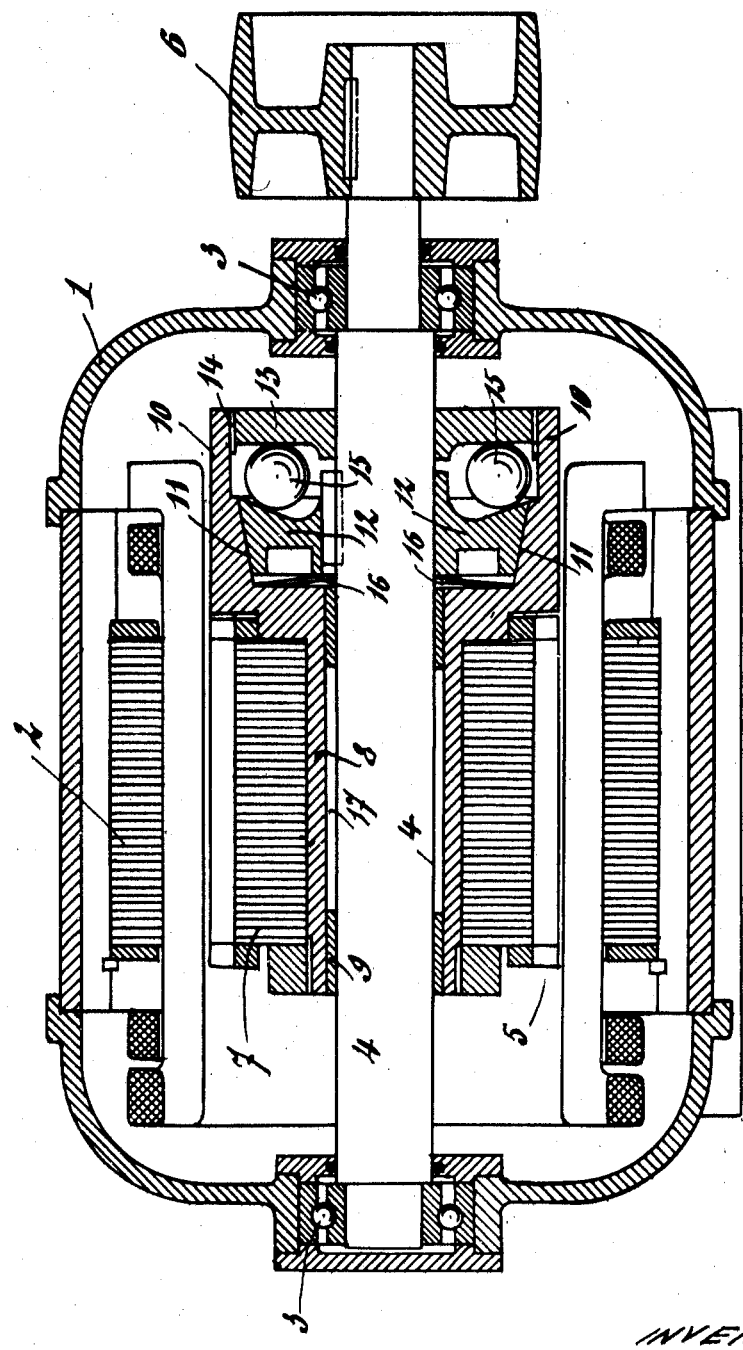

1,809,512

UNITED STATES PATENT OFFICE

VICTOR JEAN DEFAYS AND PAUL JOSEPH LEFEBVRE, OF BRUSSELS, BELGIUM, ASSIGNORS TO LA MAGNETO BELGE, SOCIETE ANONYME, OF BRUSSELS, BELGIUM

ELECTRIC MOTOR

Application filed July 9, 1929, Serial No. 377,010, and in Belgium July 13, 1928.

This invention relates to an electric motor of the kind in which members are provided in order to produce a gradual starting of the motor when it is under load.

Motors are known in which the rotor is freely mounted on the driving shaft of the motor and in which devices are provided in order to allow the motor to start under load, without that the starting current reaches a too high value.

All those devices can however only be applied to a certain class of motors but not to motors which must eventually act as generator in order to send current in the network.

Moreover in these motors there occurs generally an axial thrust against the journals, thrust caused by the impossibility of obtaining a perfect magnetic centering for the rotor.

The invention has for its object to obviate these drawbacks that is to say not only to reduce the sudden starting current to the lowest value consistent with the type of motor under consideration but also to obtain a reversible driving so that the advantages of the gradual starting are secured either in the case of working as motor or in the case of working as generator.

With this object in view, the invention essentially consists in the special arrangement and combination of parts hereinafter fully described and pointed out in the appended claims.

These objects are attained by the mechanism illustrated in the accompanying drawing in which—

The single figure is a vertical section of the entire machine.

On this drawing, 1 designates the external casing of the motor, carrying the stator 2 and supporting, by means of ball bearings, the shaft 4 on which is mounted the rotor 5 provided with a suitable winding, such as a squirrel-cage winding. This shaft 4 carries externally to the casing 1 a driving pulley 6 or the apparatus or parts to be driven by the motor. In accordance with the invention the rotor 5 comprises a laminated armature 7 mounted on a cylindrical sleeve 8 on which the cross stampings are secured. This sleeve is provided at its ends with two concentric rings 9 by means of which it is free to revolve on the shaft 4. In the example shown, the sleeve 8 is integral with the coupling drum 10 constituting a friction cone 11 cooperating with a second friction cone keyed on the shaft 4 of the motor.

This key arrangement allows nevertheless, of a longitudinal displacement of the cone 12 on this shaft. The coupling drum 10 is closed by a plate 13 screwed at 14 on the end of the drum, and, between this plate and the cone 12 are placed, in a known manner, ball-shaped masses 15 which, when rotating are thrown by centrifugal force between the plate 13 and the cone 12 so as to cause, by pressure, the clutching of the cone 12 with the cone 11. A spring 16 interposed between the cone 12 and the coupling drum 10 maintains the cones 12 and 11 apart when at rest; the cylindrical sleeve 8 may move longitudinally on the shaft 4 through an amount sufficient for permitting the perfect magnetic centering of the rotating parts without any other external force being able to act upon the clutch.

As it will be understood, at the starting the cone 12 is not in contact with the cone 11 bodily connected with the rotor. When the motor starts, the rotor 7 carries with it the plate 13 which rolls in the balls 15. These balls, under the action of the centrifugal force are moved away from the shaft and exert a thrust on the cone 12; which comes into contact with the cone 11; the result is that the shaft 4 on which the cone 12 is keyed is put gradually in motion.

The rotor, in a motor so constructed, preserves consequently an entire freedom to rotate when the motor is at rest and, on starting, the connection of the rotor with the shaft is obtained in an absolutely gradual manner after the closure of the circuit. In case of overload of the motor, the latter is efficiently protected owing to the slipping of the clutch. The latter being enclosed inside the motor is completely protected and its presence cannot in any way prevent the utilization of the shaft while it is free outside the motor bearings, for directly driving any transmission part in the ordinary manner. In practice, the space 17 left free between the extreme rings 9 constituting the journals, the shaft 4 and the sleeve 8 is utilized as lubrication chamber.

It must be observed that in this motor, the balls which connect the rotor with the shaft of the motor are always in contact with the cone 12 and with the plate bodily connected with the rotor, that is to say that the balls may be put in motion either by the rotor, or by the shaft, when the motor is used as generator.

It must be observed that in the case of the device described the ball-shaped masses are absolutely free in their movements, that is to say that they are always adapted to rotate on itself but also to roll around the shaft between the plate bodily connected with the rotor and the clutching member keyed on the shaft and to be thrown away from the latter under the action of the centrifugal force. Moreover the magnetic centering of the rotor is obtained automatically in view of the fact that the rotor instead of being keyed in a permanent way on the shaft which is to be driven, is freely mounted on the latter through the intermediary of a sleeve which is adapted to be displaced longitudinally on the said shaft.

What we claim is:

1. In an electric motor in combination a rotor, a sleeve on which the rotor is mounted, the said sleeve being free to turn on the shaft of the motor and being adapted to be displaced axially on the said shaft, whereby the magnetic centering of the rotor is obtained, a coupling clutch and a plate formed by the said sleeve, a clutch member keyed on the shaft and adapted to be displaced axially on the latter, balls free to rotate and disposed between the said plate and an inclined face of the said clutch member, the said balls being adapted to be displaced around the shaft and to be thrown away from the latter under the action of the centrifugal force, whereby the rotor is adapted to be clutched with the shaft.

2. In an electric motor in combination a rotor, a sleeve on which the rotor is mounted, the said sleeve being adapted to slide longitudinally on the shaft, rings interposed between the said sleeve and the said shaft and whereby the sleeve is adapted to rotate on the shaft, a coupling clutch and a plate formed by the said sleeve, a clutch member keyed on the shaft and adapted to be displaced longitudinally on the latter, balls quite free to rotate and to be carried away around the shaft and disposed between the said plate and an inclined face of the said clutch member whereby the rotor is adapted to be secured on the shaft.

3. In an electric motor, in combination, a rotor, a sleeve on which the rotor is mounted, the said sleeve being free to turn on the shaft of the motor and being adapted to be displaced axially on the said shaft, a coupling drum and a plate formed by the said sleeve, the said drum forming a friction cone, a second friction cone keyed on the shaft and adapted to slide longitudinally of the shaft, a plate mounted on the shaft and whereby the coupling drum is closed, ball-shaped masses free to rotate and interposed between the said plate and the friction cone, the said masses being adapted to cause the clutching of the two cones when carried away under the action of the centrifugal force from the shaft.

4. In an electric motor, in combination, a rotor, a sleeve on which the rotor is mounted, the said sleeve being free to turn on the shaft of the motor and being adapted to be displaced axially on the said shaft, a coupling drum and a plate formed by the said sleeve, the said drum forming a friction cone, a second friction cone keyed on the shaft and adapted to slide longitudinally of the shaft, a plate whereby the coupling drum is closed, a spring interposed between the cone keyed on the shaft and the coupling drum, ball-shaped masses free to rotate and interposed between the said plate and the friction cone keyed on the shaft the said masses being adapted to cause the clutching of the two cones when carried away under the action of the centrifugal force from the shaft.

5. In an electric motor comprising a rotor, a shaft and a centrifugal clutch for connecting the shaft to the rotor, in combination, a sleeve carrying the rotor, the said sleeve being free to turn on the shaft and to be displaced axially on the said shaft, a hollow coupling element formed by the said sleeve, a plate closing the said coupling element, a second coupling element keyed on the shaft to rotate therewith but adapted to be displaced axially thereon, the said second coupling element being arranged within the hollow coupling element formed by the sleeve, between the said coupling element and the closing plate, and balls interposed between the second coupling element and the closing plate, whereby when both coupling elements are in frictional contact the rotor with both coupling elements can move longitudinally as a whole on the shaft to secure the magnetic centering of the rotor.

In testimony whereof we have affixed our signatures.

VICTOR JEAN DEFAYS.
PAUL JOSEPH LEFEBVRE.